United States Patent [19]

Shibuya

[11] Patent Number: 5,144,181
[45] Date of Patent: Sep. 1, 1992

[54] CARBON BRUSH FOR MINIATURE MOTORS AND METHOD OF MAKING SAME

[75] Inventor: Isao Shibuya, Matsudo, Japan

[73] Assignee: Mabuchi Motor Co., Ltd., Chiba, Japan

[21] Appl. No.: 669,041

[22] Filed: Mar. 14, 1991

[30] Foreign Application Priority Data

Mar. 16, 1990 [JP] Japan .................. 2-66671

[51] Int. Cl.$^5$ ........................................ H02K 13/00
[52] U.S. Cl. ............................ 310/254; 310/252; 252/502; 252/503; 264/29.1
[58] Field of Search ........... 310/40 MM, 248, 249, 310/251–253; 252/502, 503; 427/114; 264/29.1, 29.5

[56] References Cited

U.S. PATENT DOCUMENTS

| | | | |
|---|---|---|---|
| 1,202,818 | 10/1916 | Edgecomb | 252/503 |
| 2,041,895 | 5/1936 | Bemis et al. | 252/503 |
| 2,098,062 | 11/1937 | Palmer | 427/114 |
| 2,252,277 | 8/1941 | Tate et al. | 252/503 |
| 3,173,045 | 3/1965 | Oliver | 310/248 UX |
| 3,772,080 | 11/1973 | McKee | 427/114 |
| 4,119,572 | 10/1978 | Fridman et al. | 427/114 |
| 4,347,456 | 8/1982 | Chabrerie | 310/248 |
| 4,799,957 | 1/1989 | Vogel | 252/502 |

FOREIGN PATENT DOCUMENTS

| | | | |
|---|---|---|---|
| 0237099 | 7/1986 | German Democratic Rep. | 310/251 |
| 0071909 | 6/1976 | Japan | 310/253 |
| 0129158 | 11/1978 | Japan . | |
| 285951 | 11/1990 | Japan . | |
| 164048 | 7/1991 | Japan . | |
| 2233001 | 1/1991 | United Kingdom | 310/251 UX |

Primary Examiner—R. Skudy
Attorney, Agent, or Firm—McGlew & Tuttle

[57] ABSTRACT

A carbon brush for miniature motors comprising a stator using a permanent magnet as the field, and a rotor on which a rotor winding is wound, and having a commutator for feeding current to the rotor winding and brushes, formed by bonding graphite powder, for making sliding contact with the commutator; the brush being a metal-plated graphite brush formed by adding 0.1 wt. % to 12.0 wt. % of a fibrous material of particle sizes less than 40 microns and lengths less than 50 microns to metal-plated graphite powder formed by coating graphite powder with a metallic layer, and pressure-forming and sintering a mixture of the metal-plated graphite powder and the fibrous material; the graphite powder containing less than 0.05 wt. % of ashes, and the method of making the same.

3 Claims, 6 Drawing Sheets

FIG. 3

| TEST No. | TYPE OF ADDITION AGENT | SERVICE HOURS TO MOTOR FAILURE (HOURS) 10 20 30 40 50 60 70 80 | AVERAGE SERVICE HOURS TO MOTOR FAILURE | DEGREE OF WEAR |
|---|---|---|---|---|
| 1 | NO ADDITION | | OK | 100% |
| 2 | OXIDE POWDER | | OK | 34% |
| 3 | ELECTRICALLY CONDUCTIVE MATERIAL | | OK | 30% |
| 4 | FIBROUS MATERIAL | | OK | 18% |

FIG. 4

| TEST No. | AMOUNT OF ADDITION (wt%) | SERVICE HOURS TO MOTOR FAILURE (HOURS) 10 20 30 40 50 60 70 80 | AVERAGE SERVICE HOURS TO MOTOR FAILURE | DEGREE OF WEAR |
|---|---|---|---|---|
| 1 | 0.1 | ⊢──────────────────⊣ | OK | 24% |
| 2 | 0.5 | ⊢──────────────────⊣ | OK | 20% |
| 3 | 1.0 | ⊢──────────────────⊣ | OK | 18% |
| 4 | 3.0 | ⊢──────────────────⊣ | OK | 19% |
| 5 | 5.0 | ⊢──────────────────⊣ | OK | 18% |
| 6 | 10.0 | ⊢──────────────────⊣ | OK | 18% |
| 7 | 12.0 | ⊢──────────────────⊣ | OK | 19% |
| 8 | 15.0 | ××××××× | 64 H | ALL MOTORS FAILED |

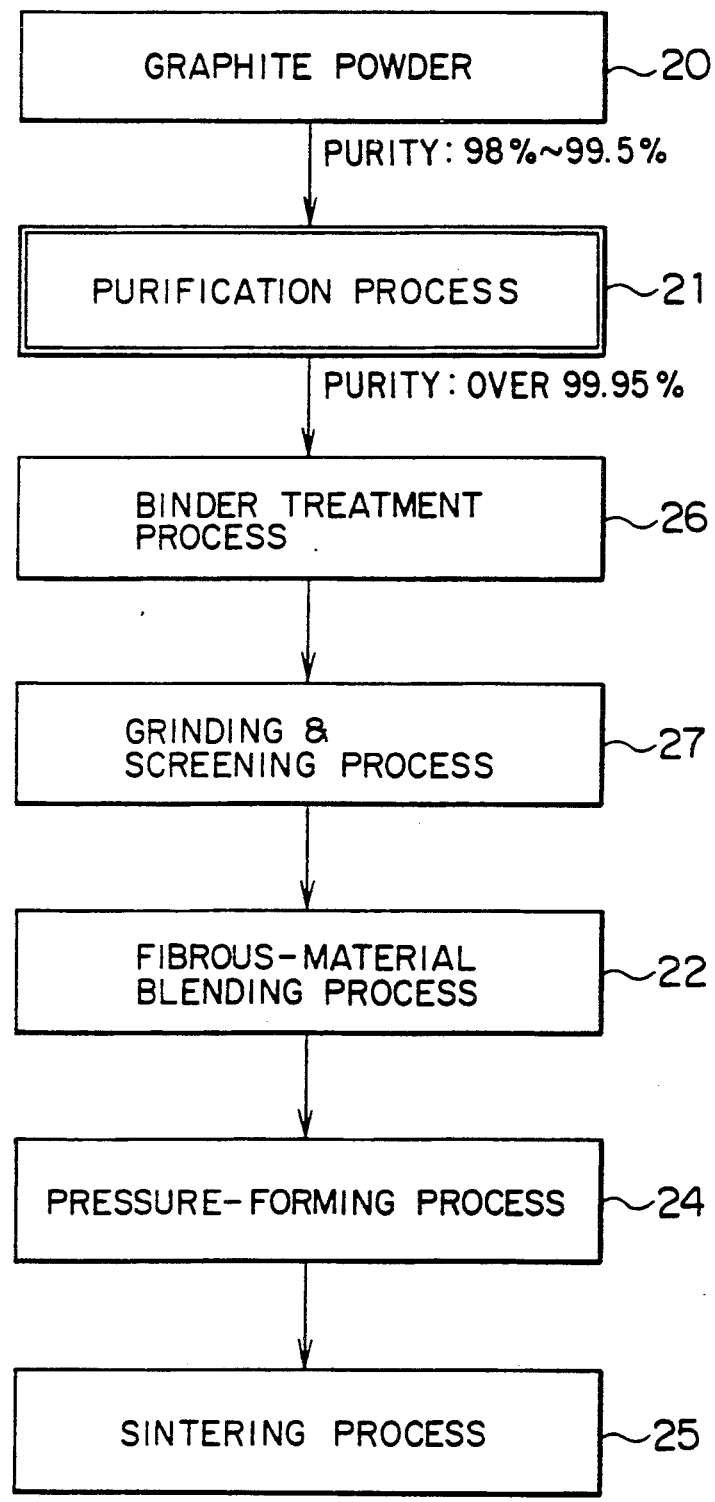

CARBON BRUSH FOR MINIATURE MOTORS AND METHOD OF MAKING SAME

BACKGROUND OF THE INVENTION

This invention relates generally to a carbon brush for miniature motors having a permanent-magnet field, and more particularly to a metal-plated graphite brush formed by adding a fibrous material to metal-plated graphite powder formed by coating graphite powder with a metallic layer, and pressure-forming and sintering a mixture of the metal-plated graphite powder and the fibrous material.

DETAILED DESCRIPTION OF THE EMBODIMENT

Carbon brushes for miniature motors have heretofore been manufactured by adding a binder to graphite powder purified to approximately 98% or 99.5%, grinding and screening the solidified mixture, blending metallic powder with the ground and screened mixture to impart desired electrical conductivity as necessary, and then pressure-forming and sintering the resulting mixture.

Furthermore, to eliminate the use of the binder, a so-called copper-plated graphite brush is known. The copper-plated graphite brush is manufactured by copper-plating particles of graphite powder which has been purified to approximately 99%, then pressure-forming and sintering the copper-plated graphite powder without adding a binder.

In either case, ashes of particle sizes 1 to 500 microns, such as $SiO_2$, $Al_2O_3$, $Fe_2O_3$, MnO, MgO and TiO, are usually contained in the graphite powder.

FIG. 7 is a micrograph illustrating the particle structure of ashes chiefly consisting of $SiO_2$ contained in the graphite powder. The micrograph indicates that the ashes have varied particle sizes, and even ashes of large particle sizes.

Carbon brushes containing ashes of particle sizes more than 50 microns tend to deteriorate commutation properties as the ashes enter between the carbon brushes and the commutator during the revolution of the motor, leading to motor failure in extreme cases.

To cope with this, the present Applicant earlier proposed carbon brushes for miniature motors manufactured by a manufacturing method incorporating a purification process where the graphite powder is purified to an ash content of less than 0.05 wt. %, and methods of making the same.

It was revealed in the tests that a carbon brush for miniature motors manufactured by metal-plating graphite powder purified in the abovementioned purification process, and pressure-forming and sintering the powder (Japanese Patent Application No. 103201/1989) is superior in reducing mechanical noises and improving commutation properties, but is prone to severe wear, as shown in FIG. 3 (Test No. 1), which will be described later.

To improve wearability, the present Applicant proposed a carbon brush for miniature motors, and a method of making the same (Japanese Patent Application No. 103201/1989), in which oxides are added to graphite powder that has been purified in the purification process, and a carbon brush for miniature motors, and a method of making the same (Japanese Patent Application No. 247114/1989), in which an electrically conductive material is added in the same manner.

It was revealed in the tests that the abovementioned carbon brushes to which oxides or an electrically conductive material is added have improved wearability but are poor in shape stability (not shown).

SUMMARY OF THE INVENTION

This invention is intended to solve these problems. To achieve this, a carbon brush for miniature motors according to this invention is formed by using graphite powder purified to less than 0.05 wt. % of ash content, and adding 0.1 wt. % to 12.0 wt. % of a fibrous material having particle sizes less than 40 microns and lengths less than 50 microns to the graphite powder.

BRIEF DESCRIPTION OF THE DRAWING

FIG. 1 (B) is a diagram of assistance in explaining a manufacturing method according to this invention.

FIG. 3 is a diagram of assistance in explaining the relationship between the type of addition agent and the degree of wear.

FIG. 4 is a diagram of assistance in explaining the relationship between the amount of addition of fibrous material and the degree of wear in this invention.

FIG. 6 is a diagram of assistance in explaining another embodiment of this invention.

DETAILED DESCRIPTION OF THE EMBODIMENTS

Figure 1A:
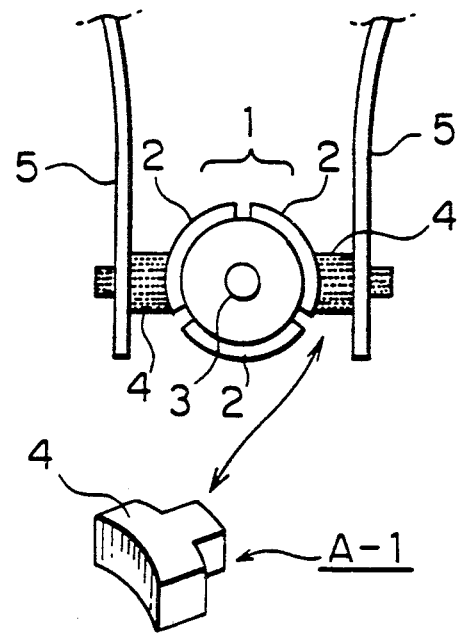
FIG. 1 (A) is a schematic diagram illustrating the principle of a carbon brush for miniature motors embodying this invention.
Figure 1B:
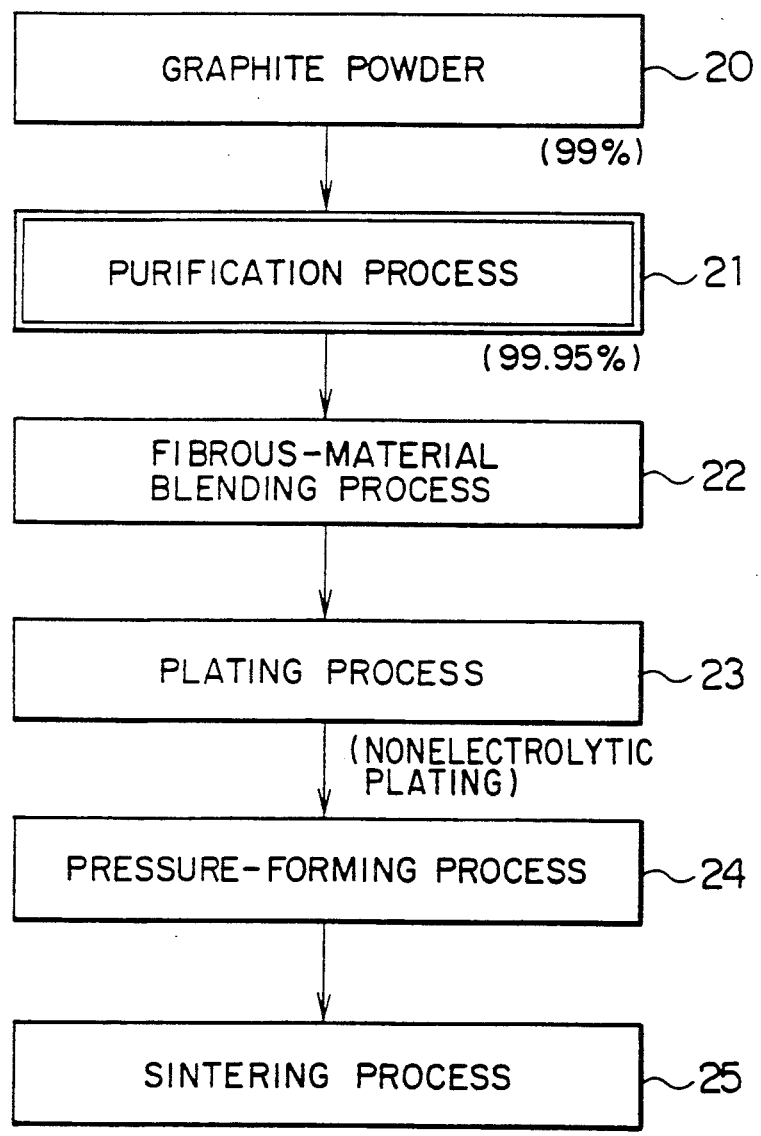

FIG. 1A and 1B illustrate the principle of this invention; FIG. 1 (A) being a schematic diagram illustrating the principle of the product of this invention, and FIG. 1 (B) a diagram illustrating the manufacturing process.

In the figure, reference numeral 1 refers to a commutator; 2 to a commutator segment; 3 to a rotor shaft; 4 to a carbon brush; and 5 to a brush resilient member, respectively.

In FIG. 1 (B), numeral 20 denotes graphite powder purified to approximately 99%, for example; 21 a purification process according to this invention; 22 a fibrous-material blending process, in which 0.1 wt. % to 12.0 wt. % of a fibrous material (glass fiber, alumina fiber, silica fiber, zirconia fiber, carbon fiber, whisker, etc.) of particle sizes less than 40 microns and lengths less than 50 microns is added; 23 a metal-plating process; 24 a pressure-forming process; and 25 a sintering process.

The carbon brushes 4 are held by electrically conductive brush resilient members 5 and supported in such a manner as to make sliding contact with commutator segments 2, 2 and 2. The carbon brush 4 is sintered into an inverted T shape with the stem thereof being supported by the brush resilient member 5, as shown in FIG. 1A, a perspective view of the brush. The bottom surface of the inverted T shape is formed into a slightly curved shape to make sliding contact with the commutator segment 2.

The carbon brush is manufactured, as shown in FIG. 1 (B), by executing the purification process 21, the fibrous-material blending process 22, the metal-plating process 23, the pressure-forming process 24, and the sintering process 25 on the graphite powder 20.

A copper-plated graphite brush manufactured by coating graphite powder with copper is publicly known. The present invention is characterized in that the graphite power is purified to have an ash content of less than 0.05 wt. % in the purification process 21, thus bringing the ash content of the manufactured carbon brush 4 to less than 0.05v wt. %. That is, the carbon brush according to this invention has an excellent commutation properties due to the extremely low ash content of the brush.

Addition of 0.1 wt. % to 12.0 wt. % of the abovementioned fibrous material having particles of a size less than 40 microns and with a length less than 50 microns in the fibrous-material blending process 22 helps improve shape stability and wear resistance.

Furthermore, almost the same treatment as in the proceses in the prior art is performed in the metal-plating process 23, pressure-forming process 24 and sintering process 25 as shown in FIG. 1 (B).

Figure 2:
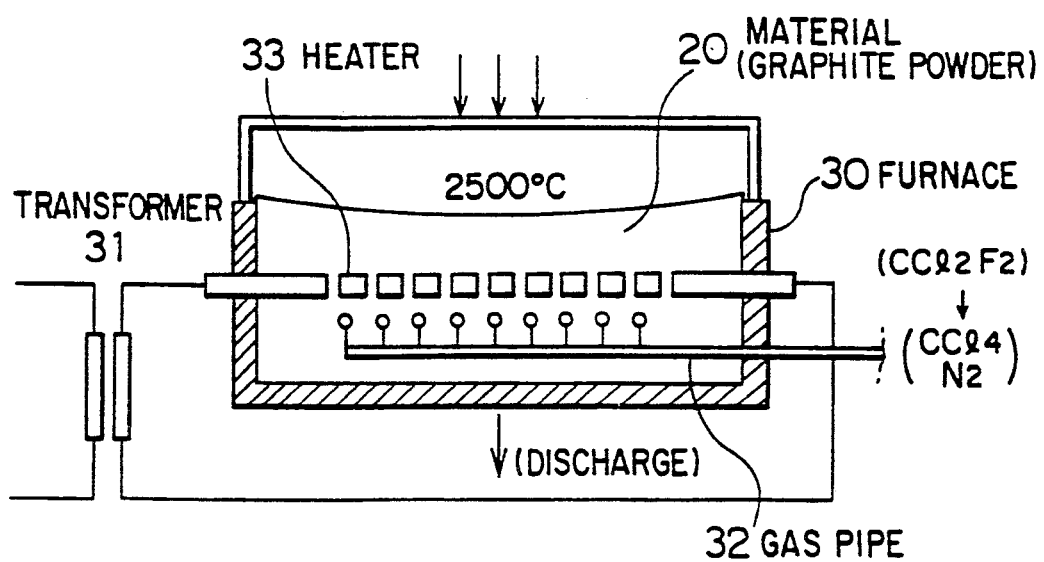
FIG. 2 is a conceptual diagram illustrating a refining furnace used in a purification process according to this invention.

FIG. 2 is a conceptual diagram of a refining furnace used in the purification process according to this invention. Numeral 20 in the figure refers to graphite powder; 30 to a furnace; 31 to a transformer; 32 to a gas pipe; and 33 to a heater, respectively.

In the purification process 21, ashes are removed from the graphite powder 20 by using a halogen-liberating substance, such as $CCl_4$ or $CCl_2f_2$, which readily liberates halogen at high temperatures in an inert gas, such as nitrogen or argon. That is, when the graphite powder 20 is charged into the furnace 30 in which the halogen gas pipe 32 is placed in the graphite powder 20. As temperature in the furnace is raised by the heater 33 to approximately 1,800 degrees centigrade, $CCl_4$ saturated in the inert gas is fed through the gas pipe 32. In this state, it can be assumed that the following reactions take place in the furnace.

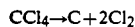

$$CCl_4 \rightarrow C + 2Cl_2$$

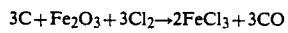

$$3C + Fe_2O_3 + 3Cl_2 \rightarrow 2FeCl_3 + 3CO$$

When the temperature rises further to 1,900 degrees centigrade, $CCl_4$ is replaced with $Cl_2F_2$, and purification treatment is continued for over 4 hours at over 2,500 degrees centigrade. In the subsequent cooling process, flushing with an inert gas, such as nitrogen or argon, is maintained to prevent the reversed diffusion of the ash content and remove halogen.

The purity of graphite obtained in this purification process is over 99.95%, with the ash content less than 0.05 wt. %.

The present Applicant manufactured copper-plated graphite brushes by using the following methods, in addition to the purification process, to improve the purity of the graphite used in metal-plated graphite brushes, and conducted tests on motors incorporating these brushes.

(i) Physical Refining

Graphite was separated from ashes with the flotation process using differences in surface physio-chemical properties of solid particles. The physical refining process handled particles of approximately 300 microns in size. Taking advantage of the fact that graphite can be separated with air bubbles, the graphite powder was charged into a mixture of oil and air bubbles, and collected by causing graphite particles to adhere to the floating air bubbles. In this process, purities of no less than 98% and less than 99.5% can be obtained. In other words, 0.5% to 2.0% of ashes are contained in the graphite powder.

(ii) Chemical Refining

The ash content the graphite powder was dissolved in high-concentrated acid and alkali solutions, and the solutions were heated (to 160 degrees centigrade to 170 degrees centigrade) and pressurized (to 5-6 atms). This treatment is commonly called the autoclave process, which mainly consists of the following reactions:

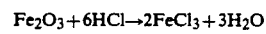

$$Fe_2O_3 + 6HCl \rightarrow 2FeCl_3 + 3H_2O$$

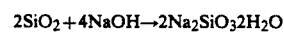

$$2SiO_2 + 4NaOH \rightarrow 2Na_2SiO_3 2H_2O$$

With this chemical treatment, purities of not less than 99% and less than 99.9% can be obtained, with impurities of not less than 0.05% and approximately 1.0% remaining in the graphite powder.

FIG. 3 shows the results of tests conducted on the carbon brushes; a brush to which oxides were added, a brush to which an electrically conductive material was added, a brush without addition agents, and a brush according to this invention; all manufactured with the manufacturing method having the purification process designed to purify graphite powder to less than 0.05 wt. % of ash content, as mentioned at the beginning of this Specification. Test No. 1 represents the test results in which a carbon brush without addition agents; Test No. 2 a carbon brush to which an electrically conductive material ($SiO_2$) of fine particle sizes was added; Test No. 3 a carbon brush to which an electrically conductive material (TiC) of fine particle sizes was added; and Test No. 4 a carbon brush according to this invention, to which a fibrous material (glass fiber) was added. FIG. 3 shows the test results obtained in maximum 80-hour-long operation tests on ten brushes each corresponding to Test Nos. 1 through 4. The amounts of addition of $SiO_2$ and TiC were 1.0 wt. % each, with the particles sizes selected to less than 40 microns. Furthermore, 1.0 wt. % of glass fiber having particles of a size (i.e. fiber width or diameter) less than 40 microns and a fiber length less than 50 microns was added in the case of Test No. 4. The column of "Service hours to motor failure" in FIG. 3 indicates that carbon brushes in Test Nos. 1 through 4 successfully withstood the 80-hour-long tests. As shown in the "Degree of wear" column at the end of 80-hour-long tests, however, there is a significant difference in the degree of wear. That is, the degree of wear was found most severe with Test No. 1, and was improved with Test Nos. 2 and 3. With Test No. 4 (this invention), the degree of wear was greatly improved.

Furthermore, it was also revealed in the tests conducted by the present Applicant that the degree of wear has a close relationship with the amount of addition of fibrous material. The relationship between the degree of wear and the amount of addition of fibrous material (glass fiber) is shown in FIG. 4. The glass fiber added to the carbon brush used in the tests has particles of a size less than 40 microns and a length less than 50 microns. The test results shown in FIG. 4 represent those on ten carbon brushes each for each Test Number, which were subjected to an 80-hour-long operation. The × mark represents the timing at which a brush failed.

As is evident from FIG. 4, the amount of addition of glass fiber must be kept within the range of 0.1 wt.% (Test No. 1) to 12.0 wt.% (Test No. 7) to reduce the degree of wear. That is, with the amount of addition of 15.0 wt.% (Test No. 8), all the carbon brushes cannot withstand an 80-hour-long operation, and fail in 64 hours of service on average.

Figure 5:
FIG. 5 is a micrograph illustrating the particle structure of glass fiber to be added to the carbon brush of this invention.
Figure 7:
FIG. 7 is a micrograph illustrating the particle structure of graphite powder including ashes chiefly consisting of $SiO_2$.

FIG. 5 is a micrograph showing the particle structure of glass fiber to be added during the manufacturing process of the carbon brush according to this invention. As is apparent from the micrograph, the particles of the glass fiber used in this invention are almost uniform in shape and size. As described earlier, the glass fiber has particles of a size less than 40 microns and a length less than 50 microns.

In the foregoing, the carbon brush of this invention manufactured with the manufacturing method shown in FIG. 1 (B) has been described. This invention, however, is not limited to it. The sequence of the manufacturing process shown in FIG. 1 (B) may be such that the purification process 21→the metal-plating process 23→the fibrous-material blending process 22→the pressure-forming process 24→the sintering 25. In this case, the same effects as those obtained with a carbon brush manufactured with the manufacturing method shown in FIG. 1 (B) can be achieved.

Next, another manufacturing method of the carbon brush of this invention will be described, referring to FIG. 6. Numeral 26 in the figure refers to a binder treatment process in which the graphite powder purified in the purification process is solidified with a binder; 27 to a grinding and screening process in which the graphite material solidified with a binder in the binder treatment process 26 is ground and screened. Other numerals correspond to like numbers in FIG. 1 (B).

In FIG. 6, the graphite power 20 is purified in the purification process 21. The graphite powder 20 purified is solidified with a binder in the binder treatment process 26. The solidified graphite material is ground and screened in the grinding and screening process 27.

Next, 0.1 wt.% to 12.0 wt.% of fibrous material having a particle size less than 40 microns and a length less than 50 microns is added and blended with the ground and screened graphite material in the fibrous-material blending process 22. Then, the graphite material is subjected to the pressure-forming process 24 and the sintering process 25 to manufacture a carbon brush 4. The fibrous-material blending process 22 in FIG. 6 may be combined with the binder treatment process 26. That is, the graphite powder purified in the purification process 21 may be subjected to binder treatment after the fibrous material is added and blended with the graphite powder.

In the foregoing, another manufacturing method of carbon brush according to this invention has been described, referring to FIG. 6. The carbon brush manufactured with the manufacturing method shown in FIG. 6 can achieve the same effects as those obtained with a carbon brush manufactured with the manufacturing method shown in FIG. 1 (B).

As described above, this invention makes it possible to provide a carbon brush having improved shape stability and wear resistance by purifying graphite powder to less 0.05 wt.% of ashes contained as impurities in the graphite powder, adding to the graphite powder 0.1 wt.% to 12.0 wt.% of fibrous material having particles of a size less than 40 microns and lengths less than 50 microns.

What is claimed is:

1. A carbon brush for miniature motors comprising a metal-plated graphite brush including 0.1 wt.% to 12.0 wt.% of a fibrous material of particles of a size less than 40 microns and a length less than 50 microns; metal-plated graphite powder being formed by coating graphite powder with a metallic layer, and pressure-forming and sintering said graphite powder to which said fibrous material is added; said graphite powder containing less than 0.05 wt.% of ashes.

2. A carbon brush for miniature motors comprising graphite powder, and 0.1 wt.% to 12.0 wt.% of a fibrous material, each fiber of said fibrous material having a fiber diameter less than 40 microns and a fiber length less than 50 microns, said graphite powder being purified to less than 0.05 wt.% of ashes contained as impurities in said graphite powder, and a mixture of said graphite powder and said fibrous material is pressure-formed and sintered to provide a pressure formed and sintered structure.

3. A carbon brush for miniature motors, comprising: graphite powder purified to include less than 0.05 wt.% ash, wherein said ash is present as an impurity; 0.1 wt.% to 12.0 wt.% of a fibrous material, each fiber of said fibrous material having a fiber diameter less than 40 microns and a fiber length less than 50 microns, said graphite powder being purified to less than 0.05 wt.% of ash and said graphite powder and fibrous material being pressure formed and sintered to provide a pressure formed and sintered structure; and, metal provided as metal-plating to said graphite powder purified to less than 0.05 wt.% of ash and said fibrous material.

* * * * *